United States Patent
Marcjan et al.

(10) Patent No.: US 11,250,433 B2
(45) Date of Patent: Feb. 15, 2022

(54) USING SEMI-SUPERVISED LABEL PROCREATION TO TRAIN A RISK DETERMINATION MODEL

(71) Applicant: MICROSOFT TECHNOLOGY LICENSING, LLC, Redmond, WA (US)

(72) Inventors: Cezary A. Marcjan, Redmond, WA (US); Hung-Chih Yang, Redmond, WA (US); Jayaram NM Nanduri, Issaquah, WA (US); Shoou-Jiun Wang, Sammamish, WA (US); Ming-Yu Fan, Bellevue, WA (US)

(73) Assignee: MICROSOFT TECHNOLOGLY LICENSING, LLC, Redmond, WA (US)

( * ) Notice: Subject to any disclaimer, the term of this patent is extended or adjusted under 35 U.S.C. 154(b) by 1133 days.

(21) Appl. No.: 15/802,180

(22) Filed: Nov. 2, 2017

(65) Prior Publication Data
US 2019/0130406 A1 May 2, 2019

(51) Int. Cl.
*G06N 20/00* (2019.01)
*G06Q 20/40* (2012.01)
*G06N 5/02* (2006.01)

(52) U.S. Cl.
CPC ......... *G06Q 20/4016* (2013.01); *G06N 5/022* (2013.01); *G06N 20/00* (2019.01)

(58) Field of Classification Search
CPC ..... G06Q 20/4016; G06N 20/00; G06N 5/022
See application file for complete search history.

(56) References Cited

U.S. PATENT DOCUMENTS 8,346,691 B1   1/2013   Subramanian et al.
8,429,212 B1   4/2013   Bengio et al.
(Continued)

FOREIGN PATENT DOCUMENTS

EP   3038046 A1   6/2016

OTHER PUBLICATIONS

"International Search Report and Written Opinion Issued in PCT Application No. PCT/US2018/054897", dated Dec. 19, 2018, 13 Pages.
(Continued)

*Primary Examiner* — Kamran Afshar
*Assistant Examiner* — Ying Yu Chen
(74) *Attorney, Agent, or Firm* — Workman Nydegger

(57) ABSTRACT

Training risk determination models based on a set of labeled data transactions. A first set of labeled data transactions that have been labeled during a review process is accessed. A first risk determination model is trained using the first set of labeled data transactions. A first risk score for data transactions of a set of unlabeled data transactions is determined using the first risk determination model. Data transactions in the set of unlabeled data transactions are newly labeled based on the first risk score. The newly labeled data transactions are added to a second set of labeled data transactions that include the first set of labeled data transactions. A second risk determination model is trained using at least the second set of labeled data transactions. A second risk score is determined for subsequently received data transactions and these data transactions are rejected or approved based on the second risk score.

20 Claims, 5 Drawing Sheets

(56) References Cited

U.S. PATENT DOCUMENTS

| | | | |
|---|---|---|---|
| 8,682,814 | B2 | 3/2014 | Dicorpo et al. |
| 9,113,781 | B2 | 8/2015 | Wels et al. |
| 9,269,057 | B1 | 2/2016 | Chandra et al. |
| 10,250,617 | B1* | 4/2019 | Gardner ............... G06F 21/566 |
| 2008/0104101 | A1 | 5/2008 | Kirshenbaum et al. |
| 2011/0251951 | A1 | 10/2011 | Kolkowitz et al. |
| 2012/0158623 | A1* | 6/2012 | Bilenko ................. G06N 20/00 706/12 |
| 2012/0226613 | A1 | 9/2012 | Adjaoute |
| 2013/0024373 | A1 | 1/2013 | Choudhuri et al. |
| 2015/0262184 | A1 | 9/2015 | Wang et al. |
| 2016/0253672 | A1 | 9/2016 | Hunter et al. |
| 2017/0039554 | A1 | 2/2017 | Greifeneder et al. |
| 2017/0124487 | A1 | 5/2017 | Szeto et al. |
| 2017/0148024 | A1 | 5/2017 | Yu et al. |
| 2017/0293917 | A1* | 10/2017 | Dhurandhar ........... G06N 7/005 |
| 2017/0330109 | A1* | 11/2017 | Maughan ................ G06N 5/04 |
| 2018/0357559 | A1* | 12/2018 | Truong ................ G06N 3/0454 |
| 2019/0042953 | A1* | 2/2019 | Duesterwald .......... G06K 9/626 |
| 2019/0114639 | A1 | 4/2019 | Nick et al. |

OTHER PUBLICATIONS

"International Search Report and Written Opinion Issued in PCT Application No. PCT/US2018/057897", dated Jan. 8, 2019, 12 Pages.

"Non Final Office Action Issued In U.S. Appl. No. 15/784,364", dated Apr. 17, 2019, 37 Pages.

Goswami, et al., "Impact of reviewer social interaction on online consumer review fraud detection", In Journal of Big Data, vol. 4, No. 15, May 15, 2017, 19 Pages.

"Final Office Action Issued in U.S. Appl. No. 15/784,364", dated Sep. 24, 2019, 39 Pages.

"Final Office Action Issued in U.S. Appl. No. 15/784,364", dated Jul. 2, 2020, 14 Pages.

"Non-Final Office Action Issued in U.S. Appl. No. 15/784,364", dated Feb. 13, 2020, 40 Pages.

"Office Action Issued in European Patent Application No.18803831.9", dated Nov. 15, 2021, 7 Pages.

Nhung, et al., "A Bootstrapping Method for Learning from Heterogeneous Data", In Proceedings of Third International Conference on Future Generation Information Technology, Dec. 8, 2011, pp. 413-422

* cited by examiner

*500*

510

Access A First Set Of Labeled Data Transactions, The First Set Of Labeled Data Transactions Having Been Labeled During A Review Process

520

Train A First Risk Determination Model Using At Least The Set Of Labeled Data Transactions

530

Determine By Use Of The Trained First Risk Determination Model A First Risk Score For Each Data Transaction In A Set Of Unlabeled Data Transactions

540

Based At Least On The Determined First Risk Score, Newly Label One Or More Of The Data Transactions In The Set Of Unlabeled Data Transactions, The Newly Labeled One Or More Data Transactions Being Added To A Second Set Of Labeled Data Transactions, The Second Set Of Labeled Transactions Including The First Set Of Labeled Transactions And The Newly Labeled Data Transactions

550

Train A Second Risk Determination Model That Is Different From The First Risk Determination Model Using At Least The Second Set Of Labeled Data Transactions

560

Determine By Use Of The Second Trained Risk Determination Model A Second Risk Score For Subsequently Received Data Transactions, The Subsequently Received Data Transactions Being Approved Or Rejected Based At Least On The Second Risk Scores

FIG. 5

USING SEMI-SUPERVISED LABEL PROCREATION TO TRAIN A RISK DETERMINATION MODEL

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been, and are being, developed in all shapes and sizes with varying capabilities. As such, many individuals and families alike have begun using multiple computer systems throughout a given day.

For instance, computer systems are now used in various data transactions such as, but not limited to, in ecommerce and the like as individuals increasing perform data transactions such as making a purchase from various vendors over the Internet. In order to perform the data transactions, the individuals are typically required to provide a payment instrument such as a credit card or bank account information such as a checking account to the vendor over the Internet. The vendor then uses the payment instrument to complete the data transaction.

The process of providing the payment instrument over the Internet leaves the various merchants subject to loss from fraudulent data transactions. For example, when a fraudulent payment instrument is used to purchase a product, the merchants often loses the costs associated with the product. This is often because the bank or financial institution that issues the payment instrument holds the merchants responsible for the loss since it was the merchants who approved the transaction at the point of sale where payment instrument is not present.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems, methods, and computer readable media for training risk determination models based on a first set of labeled data transactions. In the embodiments, a first set of labeled data transactions that have been labeled during a review process is accessed. A first risk determination model is trained using at least the set of labeled data transactions. A first risk score for each data transaction of a set of unlabeled data transactions is determined using the trained first risk determination model. Data transactions in the set of unlabeled data transactions are newly labeled based on the first risk score. The newly labeled data transactions are added to a second set of labeled data transactions that include the first set of labeled data transactions. A second risk determination model is trained using at least the second set of labeled data transactions. A second risk score is determined for subsequently received data transactions and these data transactions are rejected or approved based on the second risk score.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5 illustrates a flow chart of an example method or training one or more risk determination models based on a set of labeled data transactions.

DETAILED DESCRIPTION

Figure 1:
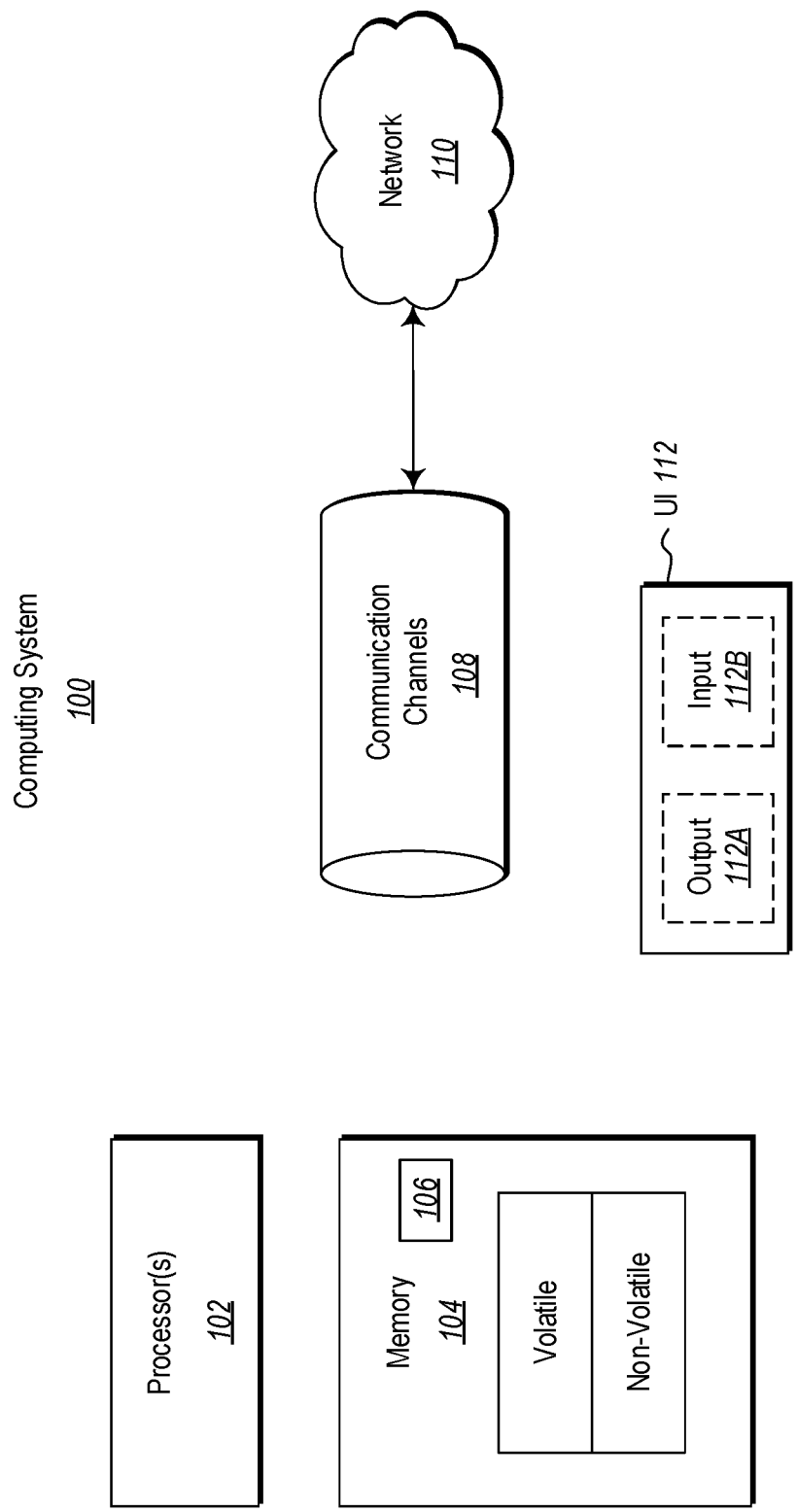
FIG. 1 illustrates an example computing system in which the principles described herein may be employed.

Fraud is as old as humanity itself and can take various forms. Moreover, new technology development provides additional ways for criminals to commit fraud. For instance, in e-commerce the information on a card is enough to perpetrate a fraud. As EMV becomes ubiquitous, fraud at physical storefronts is evolving as well—driving a movement from counterfeit card fraud to new account fraud. Growing online retail volume have brought greater opportunity to criminals—pushing fraud to card-not-present channels.

To combat fraud, many fraud detection models may be devised that attempt to label data transactions as good transactions or fraudulent transactions. However, properly labeled data transactions may be hard to acquire, especially for data transactions that are labeled as having been properly rejected. For example, in a transaction processing system, few data transactions are manually reviewed to decide if they are fraudulent or not, as the number of data transaction is large, while human reviewers are scarce and their time limited. Also, most data transactions come from normal people making a legitimate purchase, while fraudulent instances are a minority.

Because of this "low labeling" and low number of fraudulent transaction phenomenon, it's common for human reviewers to miss fraudulent instances hidden in a hay stack, i.e., false negatives exist.

Advantageously, the embodiments disclosed herein provide a solution to address this problem using a machine learning, semi-supervised method. It first utilizes the small number data transactions that are labeled as having been properly rejected or approved provided by human reviewers and trains a supervised learning risk determination model using a learner, such as gradient boosting decision trees or logistic regression. It then uses this risk determination model to score unlabeled data transactions and labels some high-scored data transactions as rejected and labels some low-scored data transactions as being approved and adds these newly labeled data transactions into the training set. Next, it trains a second risk determination model using the expanded training set. The process is repeated for training more risk determination models on an ever expanding training set until sufficient labeled data transactions have been found and the iterative process stops by a termination condition that may be specified by a user or by a determination that it is not worth the system resources to continue to expand the training set.

Embodiments disclosed herein are related to computing systems, methods, and computer readable media for training risk determination models based on a first set of labeled data transactions. In the embodiments, a first set of labeled data transactions that have been labeled during a review process is accessed. A first risk determination model is trained using at least the set of labeled data transactions. A first risk score for each data transaction of a set of unlabeled data transactions is determined using the trained first risk determination model. Data transactions in the set of unlabeled data transactions are newly labeled based on the first risk score. The newly labeled data transactions are added to a second set of labeled data transactions that include the first set of labeled data transactions. A second risk determination model is trained using at least the second set of labeled data transactions. A second risk score is determined for subsequently received data transactions and these data transactions are rejected or approved based on the second risk score.

The embodiments disclosed herein provide various technical effects and benefits over the current technology. For example, one direct improvement is the embodiments disclosed herein provide for the use of scare labeled data transactions to train risk determination models. To clarify, conventional training methods do not take actual labeled data transactions into account when training a supervised risk determination model. The use of the actual labeled data transaction may lead to better risk scoring of data transactions and fraud detection based on the risk scores.

The embodiments disclosed herein provide a further technical improvement by removing at least some need for further human review of the data transactions to label a data transaction. As will be explained in more detail to follow, the embodiments are able to increase the number of labeled data transactions without the need for the further review process, thus saving on system resources and the cost associated with the further review.

The embodiments disclosed herein provide a further technical improvement by using ensuring that any slowdowns caused by the need to wait for the further human review may be decreased or eliminated. Further, the technical effects related to the disclosed embodiments can also include improved user convenience and efficiency gains.

Some introductory discussion of a computing system will be described with respect to FIG. 1. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
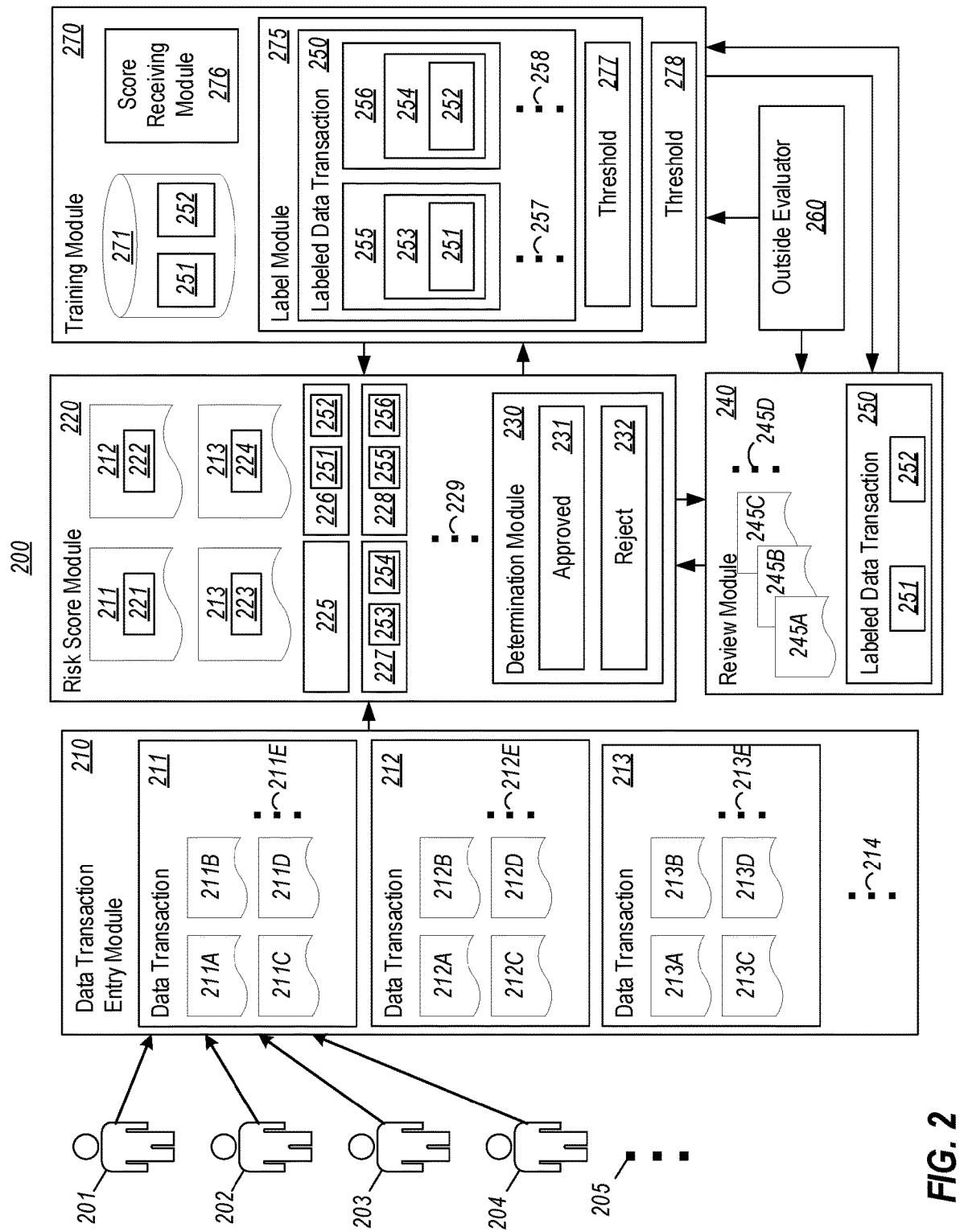
FIG. 2 illustrates a computing system that may implement the embodiments disclosed herein.

Attention is now given to FIG. 2, which illustrates an embodiment of a computing system 200, which may correspond to the computing system 100 previously described. The computing system 200 includes various components or functional blocks that may implement the various embodiments disclosed herein as will be explained. The various components or functional blocks of computing system 200 may be implemented on a local computing system or may be implemented on a distributed computing system that includes elements resident in the cloud or that implement aspects of cloud computing. The various components or functional blocks of the computing system 200 may be implemented as software, hardware, or a combination of software and hardware. The computing system 200 may include more or less than the components illustrated in FIG. 2 and some of the components may be combined as circumstances warrant. Although not necessarily illustrated, the various components of the computing system 200 may access and/or utilize a processor and memory, such as processor 102 and memory 104, as needed to perform their various functions.

As shown in FIG. 2, the computing system 200 may include a transaction entry module 210. In operation, the transaction module 210 may receive input from multiple users 201, 202, 203, 204, and any number of additional users as illustrated by the ellipses 205 to initiate a data transaction that is performed by the computing system 200. For example, the user 201 may initiate a data transaction 211, the user 202 may initiate a data transaction 212, and the user 203 may initiate a data transaction 213. The ellipses 214 represent any number of additional data transactions that can be initiated by one or more of the users 205. Of course, it will be noted that in some embodiments a single user or a number of users less than is illustrated may initiate more than one of the transactions 211-214.

The data transactions 211-214 may represent various data transactions. For example, as will be explained in more detail to follow, the data transactions 211-214 may be purchase or other financial transactions. In another embodiments, the transactions 211-214 may be transactions related to clinical or scientific research results. In still, other embodiments, the transactions 211-214 may be any type of transaction that is subject to fraud and is thus able to be characterized as being properly approved, improperly approved, properly rejected, or improperly rejected as a result of the fraud. Accordingly, the embodiments disclosed herein are not related to any type of data transactions. Thus, the embodiments disclosed herein relate to more than purchase or financial transactions and should not be limited or analyzed as only being related to purchase or financial transactions.

The transaction entry module 210 may receive or determine information about each of the data transactions 211-214. For example, if the data transactions 211-214 are purchase or other financial transactions, then the transaction entry module 210 may determine personal information about the user, payment information such as a credit or debit card number, and perhaps the product that is being purchased. If the data transactions are clinical or scientific research data transactions, then the data transaction entry module 210 may determine identifying information about the research such as participant information and result information. The transaction entry module 210 may receive or determine other information about other types of data transactions as circumstances warrant.

The computing system 200 may also include a risk score module 220. In operation, the risk score module 220 may determine a risk score for each of the data transactions 211-215 based on one or more risk determination models 225, 226, 227, 228 or any number of additional risk score models as determined by the ellipses 229. The risk scores may be a probability that is indicative of whether a given data transaction is a good transaction that should be approved or is a fraudulent or bad transaction that should be rejected. In one embodiment, the risk determination models 225-229 may be a gradient boosting decision tree, while in other embodiments the risk determination models may be an artificial neural network or some other type of making learning classifier. Accordingly, it will be appreciated that the embodiments disclosed herein are not limited by a particular type of the risk determination models 225-229.

As mentioned, the risk score module 220 may determine a risk score for each of the data transactions 211-214 based on one or more of the risk determination models 225-229. For example, the score module may determine a risk score 221 for the data transaction 211, a risk score 222 for the data transaction 212, a risk score 223 for the data transaction 213, and a risk score 224 for the data transaction 214 based on the risk determination model 225. The risk scores 221-224 may specify a probability that determines if each of the data transactions 211-214 is to be approved (i.e., the data transactions are performed or completed) or if the transactions are to be rejected (i.e., the data transactions are not completed or performed).

In some embodiments, the determination of the risk scores may be based at least in part on one or more attributes that are associated with each of the data transactions 211-214. In some embodiments, the attributes may also be referred to as a "feature", or an "input variable". For example, as illustrated in FIG. 2, the data transaction 211 is associated with attributes 211a, 211b, 211c, and 211d, with the ellipses 211e representing that there can be any number of additional attributes associated with the data transaction 211. Similarly, the data transaction 212 is associated with attributes 212a, 212b, 212c, and 212d, with the ellipses 212e representing that there can be any number of additional attributes associated with the data transaction 212. Likewise, the data transaction 213 is associated with attributes 213a, 213b, 213c, and 213d, with the ellipses 213e representing that there can be any number of additional attributes associated with the data transaction 213. The data transactions 214 may also be associated with any number of attributes.

In the embodiment related to the purchase or other financial transactions, the various attributes may be related to the product or service being purchased and to the purchaser of the product and service. For example, the attribute 211a, 212a, and 213a may specify a purchase price for the product or service, the second attribute 211b, 212b, and 213b may specify the past payment history of the purchaser of the product and service, and the third attribute 211c, 212c, and 213c may specify a profit margin for each transaction for the seller of the product or service. Attributes 211d, 212d, and 213d may specify a location the data transaction was initiated or may provide information about the computing device used to initiate the data transaction such as operating system language or browser type. It will be appreciated that the various attributes may be any information that provides additional detail about the data transactions and the embodiments disclosed herein are not limited by any particular attribute.

In the embodiment related to the to the clinical or scientific research results, the various attributes may specify the amount of error that is acceptable, the research goals, and other relevant factors. These may be used by the risk score module 220 as needed. In other embodiments, various other attributes may be used as needed by the risk score module 220.

The risk score module may further include a decision module 230 that in operation uses the risk scores 221-224 to determine if each data transaction should be approved or rejected based on the risk score generated by one or more of the risk determination models 225-229. That is, the decision module 230 may, based on the operation of the risk determination models, determine which data transactions should be approved as denoted at 231 and which should be rejected based on the risk scores as denoted at 232. In one embodiment, the decision model 225-229 may set a boundary or demarcation for risk scores that will be approved and risk scores that will rejected.

Figure 3:
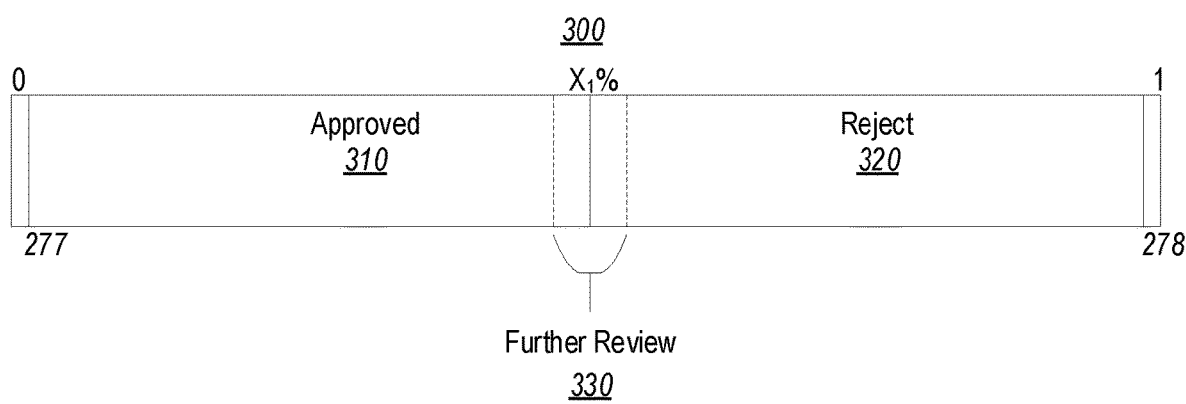
FIG. 3 illustrates an embodiment of a risk score band.

For example, FIG. 3 shows risk scores with probabilities from 0 to 1, with those data transactions having a lower probability of being a fraudulent data transaction being given a lower score and those data transactions having a higher probability of being a fraudulent activity being given a higher score. As illustrated, those data transactions (i.e., data transactions 211-214) that are assigned a risk score (i.e., risk scores 221-224) between 0 and X1% are included in an approve portion 310 and those data transactions that are assigned a risk score from X1% to 1 are included in a rejected portion 320. In the embodiment, X1% may be considered, based on the relevant risk determination model used to generate the risk scores, a demarcation between those data transactions that are considered likely enough to be fraudulent (i.e., those data transactions in reject portion 320) so that they should be automatically rejected and those data transactions that are considered likely to not be fraudulent (i.e., those data transactions in approve portion 310) so that they should be automatically approved.

In the illustrated embodiment X1% is set to 50% for ease of explanation only. That is, about 50% of the data transactions are approved and 50% of the data transactions are rejected based on the relevant risk determination model used to generate the risk scores. However, in many embodiments a threshold or cutoff may be applied that moves the location of X1% to more fully reflect historical norms of where the demarcation between the approved and rejected data transactions should be. For example, in one embodiment X1% may be set around 80% so that only those data transactions that are determined to have an 80% or higher likelihood of being rejected are automatically rejected since most data transactions are non-fraudulent data transactions. Accordingly, the illustration of the demarcation at 50% should not be used to limit the embodiments disclosed herein.

However, as shown in FIG. 3 by the dashed lines on both sides of the line at X1%, there are some data transactions that are close to X1%. Since these transactions are close to X1%, it is likely that some of those to the left of the line are false negatives, that is bad or fraudulent data transactions that should have been rejected instead of being approved and some of those to the right of the line are false positives, that is good or non-fraudulent data transactions that should not have been rejected, but should have been approved. In some embodiments, the data transactions close to X1% may be marked as needing further review, as denoted at 330.

Accordingly, the computing system 200 may also include a review module 240, which may be a computing entity or a human entity that utilizes the review module 240. In operation, the review module 240 receives at least some of those data transactions close to X1% and performs further review on these data transactions to determine if the data transactions should be approved or rejected. For example, the review module may apply one or more additional review criteria 245a, 245b, 245c, and any number of additional review criteria as illustrated by ellipses 245d (hereinafter also referred to "additional review criteria 245"). In some embodiments the additional review criteria 245 may be to review of social media accounts of the initiator of the data transaction, review and/or contact of third parties associated with the initiator of the data transaction, contact with a credit card company that issues a credit card associated with the initiator of the data transaction, or direct contact with the initiator of the data transaction through a phone call, SMS, email, or other real time (or near real time) forms of communication. It will be appreciated that there may be other types of additional review criteria.

Based on the results of the additional review criteria 245, the review module 2450 may determine if the data transactions near X1% should be approved or rejected. For example, if the additional review criteria 245 indicate that it is likely that some of these data transitions are a valid, non-fraudulent data transactions, then these data transactions may be approved. On the other hand, if the additional review criteria indicate that it is likely that at least some of these data transition are fraudulent data transactions, these data transactions may be rejected. The review module 240 may then label these transactions as being approved or rejected. For example, as illustrated the review module may determine a set of labeled data transactions 250, which may initially include a set 251 of data transactions that are labeled as being approved and a set 252 of data transactions that are labeled as being rejected. Since the further review process was performed on the data transactions in the sets 251 and 252, there is a high likelihood that the data transactions were properly approved or properly rejected.

As may be appreciated, those data transactions which were automatically approved by the decision module 230 based on the risk score may be performed by the computing system 200. Thus, in the embodiment where the data transactions are a purchase or other financial transaction the computing system 200 may perform the purchase by receiving payment from the user and then providing the product to the user. In such case, the computing system 200 is able to determine if a data transaction was properly approved, which is if the user actually paid for the product. The computing system 200 is also able to determine if a data transaction was improperly approved, that is if the user provided a fraudulent payment instrument and the computing system 200 received a charge-back from an outside evaluator 260. The outside evaluator 260 may be a bank or the like that determines that a data transaction approved by the decision module 230 should have been rejected because the payment source used in the data transaction was fraudulently used or obtained. In such case, the outside evaluator 260 may notify the computing system 200 that the data transaction should have been rejected, for example by providing charge-backs to the owner of the computing system 200.

However, the data transactions that are rejected by decision module 230 based on the risk scores are not actually performed or completed by the computing system 200. Accordingly, there is no way to actually determine if these transactions were properly rejected or if some of them should have been approved. In some embodiments a small amount of the rejected transactions may be allowed to be completed so that statistical analysis may be performed to determine if the underlying risk determination model is properly scoring the data transactions. However, this statistical analysis is still somewhat of a guess as to whether the data transactions are being properly rejected.

As mentioned previously, the data transactions in the set 252 are highly likely to have been properly rejected since they were subjected to the review process by the review module 240. Advantageously, as will be explained in more detail to follow, the use of the labeled sets 251 (labeled as being approved) and 252 (labeled as being rejected) may be helpful in training one or more of the risk determination models 225-229 to more accurately determine a risk score for the data transactions 211-214.

Accordingly, the computing system 200 may include a training module 270 that in operation is able to train one of the risk determination models 225-229 using the labeled data transactions 250 as an initial training set. As will be explained in more detail to follow, the training module 270 may then use the risk scores provided by the trained risk determination model to proactively label some of the unlabeled data transactions to thereby increase the size of the labeled data transactions 250 used as a training set. The expanded training set may then be used to train additional risk determination models.

As illustrated, the training module 270 may include a database 271 that may be used to store the labeled sets 251 and 252. In some embodiments, the labeled sets 251 and 252 may be determined based on the risk determination model 225 in the manner previously described and may then be stored in the database 271 prior to use by the training module 270. In other embodiments, the labeled sets 251 and 252 may be determined based on the risk determination model 225 in the manner previously described in near real time prior to their use by the training module 270.

As illustrated, the training module 270 may include a label module 275. In operation, the label module 275 may access the labeled sets 251 and 252 and may then use these labeled sets as a training set in a training operation to train the risk determination model 226 to more correctly generate the risk scores 221-224 for the data transactions. As shown in FIG. 2, the risk determination model 226 is shown as being associated with the labeled sets 251 and 252 and this is to illustrate that this model is trained in part by the use of these labeled sets.

Once the risk determination model 226 has been trained in part by the use of these labeled sets 251 and 252, the trained risk determination model 226 may then be used by the risk score module 220 to determine risk scores 221-224 for the data transactions 211-214. That is, the trained risk determination model 226 may be used by the risk score module 220 to determine the probability that a data transaction should be approved or rejected.

The training module 270 may include a risk score receiving module 276 that receives the risk scores 221-224 for each of the data transactions, a low threshold 277 that specifies a risk score that is very likely to be a valid, non-fraudulent data transaction that should be approved and a high threshold 278 that specifies a risk score that is very likely to be a non-valid, fraudulent transaction that should be rejected. For example, as shown in FIG. 3, the low threshold 277 may be set very close to 0 and is thus quite distant from the X1% demarcation line. Accordingly, any data transactions having a risk score below the low threshold 277 have a very high likelihood of being a valid, non-fraudulent data transaction that should be approved. Likewise, the high threshold 278 may be set very close to 1 and is also quite distant from the X1% demarcation line. Accordingly, any data transactions having a risk score above the high threshold 278 have a very high likelihood of being a non-valid, fraudulent transaction that should be rejected. It will be appreciated that the low and high thresholds 277 and 278 may be set to any reasonable value as circumstances warrant, although they should typically be set at values that are sufficient so that there is confidence that a data transaction is very likely to be approved or rejected. Accordingly, the embodiments disclosed herein are not limited by any particular value for the low and high thresholds 277 and 278.

In operation, the risk score receiving module 276 may receive the risk scores 221-224 for each of the data transactions that were determined using the trained risk determination model 226 that was trained using the labeled sets 251 and 252. The label module 275 may then apply the low and high thresholds 277 and 278 to the risk scores to determine which data transactions have a high likelihood of being approved or rejected. Those data transactions having a risk score that is below the low threshold 277 may be labeled as being approved and the data transactions having a risk score above the high threshold 278 may be labeled as being rejected. The label module 275 may then update the labeled data transactions 250 by generating a labeled set 253 that includes those data transactions that are labeled as being approved. As shown in FIG. 2, the labeled set 253 may include those data transactions that were part of the labeled set 251 as well as any newly labeled data transactions. Likewise, the label module 275 may generate a labeled set 254 that includes those data transactions that are labeled as being rejected. As shown in FIG. 2, the labeled set 254 may include those data transactions that were part of the labeled set 252 as well as any newly labeled data transactions. Accordingly, the number of labeled transactions that may be used to train a risk determination model is increased, which may lead to a better training process. Advantageously, by using the training model 270 to proactively label those unlabeled data transactions that would most likely be labeled as approved or rejected if they were subjected to the further review process, the number of labeled transactions is able to be increase without the need for the further review process, thus saving on system resources and the cost associated with the further review. Further, any slowdowns caused by the need to wait for the further review may be decreased or eliminated.

The label module 275 may then use the labeled sets 253 and 254 as a training set in a training operation to train the risk determination model 227 to more correctly generate the risk scores 221-224 for the data transactions. As shown in FIG. 2, the risk determination model 227 is shown as being associated with the labeled sets 253 and 254 and this is to illustrate that this model is trained in part by the use of these labeled sets.

Once the trained risk determination model 227 has been trained in part by the use of these labeled sets 253 and 254, the trained risk determination model 227 may then be used by the risk score module 220 to determine risk scores 221-224 for the data transactions 211-214. That is, the trained risk determination model 227 may be used by the risk score module 220 to determine the probability that a data transaction should be approved or rejected.

The risk score receiving module 276 may receive the risk scores 221-224 for each of the data transactions that were determined using the trained risk determination model 227 that was trained using the labeled sets 253 and 254. The label module 275 may then apply the low and high thresholds 277 and 278 to the risk scores to determine which data transactions have a high likelihood of being approved or rejected. Those data transactions having a risk score that is below the low threshold 277 may be labeled as being approved and the data transactions having a risk score above the high threshold 278 may be labeled as being rejected. The label module 275 may then update the labeled data transactions 250 by generating a labeled set 255 that includes those data transactions that are labeled as being approved. As shown in FIG. 2, the labeled set 255 may include those data transactions that were part of the labeled set 253 as well as any newly labeled data transactions. Likewise, the label module 275 may generate a labeled set 256 that includes those data transactions that are labeled as being rejected. As shown in FIG. 2, the labeled set 256 may include those data transactions that were part of the labeled set 254 as well as any newly labeled data transactions.

This process may be repeated as many times as needed for one or more additional risk score determination models 229. That is, the label module 275 may continue to update the labeled data transactions 250 to include additional approved label sets as represented by the ellipses 257 and additional rejected labeled sets as represented by the ellipses 258. As with the labeled data sets previously discussed, the labeled sets 257 and 258 may include those data transactions that were previously labeled. The label module 275 may then use the updated labeled sets as training sets for one or more of the additional risk determination models 229. This iterative process may continue in some embodiments until such time that the training module 270 determines that further training of the risk determination models does not provide enough improvement in the resulting risk scores to justify the use of computing system 200 resources. In other embodiments, the user of the computing system 200 may specify the number of iterations to run, for example three, based on prior knowledge of a number of iterations that provide sufficient training to the risk determination models without unduly burdening the computing system 200 resources.

Once the training process is completed, the risk score module 220 may use the finally trained risk determination model to provide a risk score 221-224 for data transactions 211-214 received after or subsequent to the training process. Based on this risk score, the determination module 230 may determine if the subsequently received data transactions should be approved or rejected. Those that should be approved will be automatically approved and those that should be rejected will be automatically rejected by the computing system 200. In some embodiments, some of the subsequently received data transactions may be subjected to the further review process as needed.

Figures 4A, 4B, 4C:
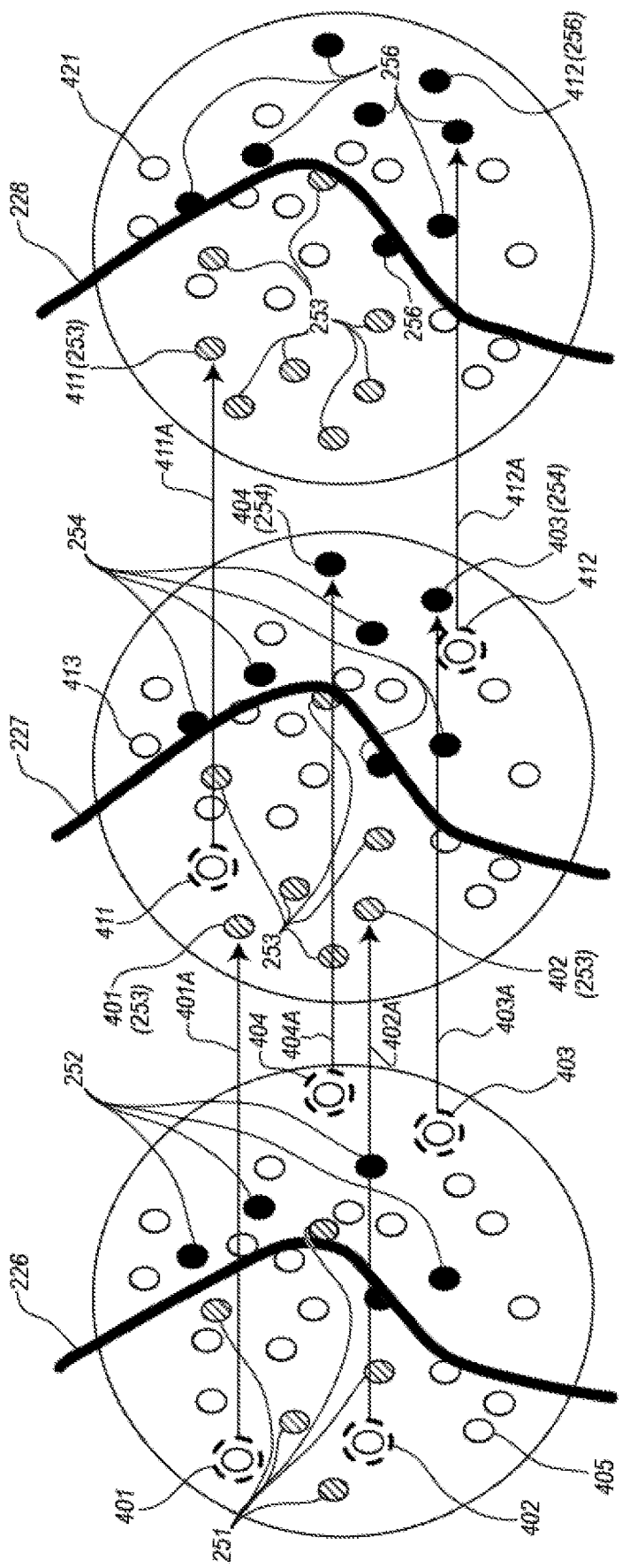
FIGS. 4A-4C illustrate a graphical example of the operation of a training module of the computing system of FIG. 2.

FIGS. 4A-4C illustrate a graphical representation of the operation of the training module 270 and its components. FIG. 4A shows those data transactions that are part of the labeled set 251 that are labeled as being approved and those data transactions that are part of the labeled set 252 that have been labeled as being rejected. As previously discussed, the label module 275 may use the labeled sets 251 and 252 to train the risk determination model 226.

As shown in FIG. 4A, a demarcation denoted at 226 represents the use of the risk determination model 226 by the risk score module 220 in scoring the data transactions 211-214. The circles to the left of the demarcation are data transactions that have been given a risk score that indicates they should be approved and the circles to the right of the demarcation are data transactions that have been given a score that indicates they should be approved.

It will be appreciated that the risk determination model 226, or any risk determination model, is not able to perfectly score the data transactions, especially those that are very close the demarcation line. Accordingly, to illustrate this FIGS. 4A-4C may show some data transactions that have been labeled as being approved on the reject (right) side of the demarcation and some data transactions that have been labeled as being rejected on the approved (left) side of the demarcation.

FIG. 4A shows data transactions 401 and 402. As illustrated in the figure, these two unlabeled data transactions are quite distant from the demarcation on the approved (left) side of the demarcation. In other words, they are below the low threshold 277. Accordingly, as shown by the lines 401a and 402a between FIGS. 4A and 4B, the data transactions 401 and 402 are labeled as being approved and are added to the approved labeled set 253.

FIG. 4A also shows data transactions 403 and 404. As illustrated in the figure, these two unlabeled data transactions are quite distant from the demarcation on the reject (right) side of the demarcation. In other words, they are above the high threshold 278. Accordingly, as shown by the lines 403a and 404a between FIGS. 4A and 4B, the data transactions 403 and 404 are labeled as being rejected and are added to the rejected labeled set 254.

FIG. 4A further shows a number of unmarked data transactions and a data transaction denoted by 405. These data transactions represent the set of unlabeled data transactions. Only one of the data transactions is denoted by 405 so that the figure does not become unreadable by the large number of references, but all unmarked data transactions should be considered as part of the set of unlabeled data transactions 405.

FIG. 4B shows those data transactions that are part of the labeled set 253 that are labeled as being approved and those data transactions that are part of the labeled set 254 that have been labeled as being rejected. As previously discussed, the labeled set 253 includes the data transactions of the labeled set 251 as well as data transactions 401 and 402. The labeled set 254 includes the data transactions of the labeled set 252 as well as data transactions 403 and 404. As previously discussed, the label module 275 may use the labeled sets 253 and 254 to train the risk determination model 227.

FIG. 4B shows that a demarcation denoted at 227 represents the use of the risk determination model 227 in scoring the data transactions 211-214. The unmarked circles to the left of the demarcation are data transactions that have been given a risk score that indicates they should be approved and the unmarked circles to the right of the demarcation are data transactions that have been given a score that indicates they should be approved. Because the risk determination model 227 was trained using the labeled set 253 and 254 and the risk determination model 226 was trained using the labeled set 251 and 252, the location of the demarcation denoted at 227 is different from that of the demarcation denoted at 226 in FIG. 4A. That is, because different training sets were used to train the risk determination models, each risk determination model will score the data transactions in a different manner. As previously discussed, the continued use of the expanded training sets in training the risk determination models should lead to more accurate scoring of the data transactions.

FIG. 4B shows data transaction 411. As illustrated in the figure, data transaction 211 is quite distant from the demarcation on the approved (left) side of the demarcation. In other words, it is below the low threshold 277. Accordingly, as shown by the line 411a between FIGS. 4B and 4C, the data transaction 411 is labeled as being approved and is added to the approved labeled set 255.

FIG. 4B also shows data transaction 412. As illustrated in the figure, data transaction 412 is quite distant from the demarcation on the reject (right) side of the demarcation. In other words, it is above the high threshold 278. Accordingly, as shown by the line 412a between FIGS. 4B and 4C, the data transaction 412 is labeled as being rejected and is added to the rejected labeled set 256.

FIG. 4B further shows a number of unmarked data transactions and a data transaction denoted by 413. These data transactions represent the set of unlabeled data transactions. Only one of the data transactions is denoted by 413 so that the figure does not become unreadable by the large number of references, but all unmarked data transactions should be considered as part of the set of unlabeled data transactions 413.

FIG. 4C shows those data transactions that are part of the labeled set 255 that are labeled as being approved and those data transactions that are part of the labeled set 256 that have been labeled as being rejected. As previously discussed, the labeled set 255 includes the data transactions of the labeled set 253 as well as data transaction 411. The labeled set 256 includes the data transactions of the labeled set 254 as well as data transaction 412. As previously discussed, the label module 275 may use the labeled sets 255 and 256 to train the risk determination model 228.

FIG. 4C shows that a demarcation denoted at 228 represents the use of the risk determination model 228 in scoring the data transactions 211-214. The unmarked circles to the left of the demarcation are data transactions that have been given a risk score that indicates they should be approved and the unmarked circles to the right of the demarcation are data transactions that have been given a score that indicates they should be approved. Because the risk determination model 228 was trained using the labeled sets 255 and 256, the location of the demarcation denoted at 228 is different from that of the demarcations denoted at 226 and 227 in FIGS. 4A and 4B. That is, because different training sets were used to train the risk determination models, each risk determination model will score the data transactions in a different manner.

FIG. 4C further shows a number of unmarked data transactions and a data transaction denoted by 421. These data transactions represent the set of unlabeled data transactions. Only one of the data transactions is denoted by 421 so that the figure does not become unreadable by the large number of references, but all unmarked data transactions should be considered as part of the set of unlabeled data transactions 421. If the training process ended with the training of the risk determination model 228, then the risk scores 221-224 given to each data transaction in the set of unlabeled data transactions 421 would be approved or rejected based on the risk score by the determination module 230.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 5 illustrates a flow chart of an example method 500 for training one or more risk determination models based on a set of labeled data transactions. The method 500 will be described with respect to one or more of the FIGS. 2-4 discussed previously.

The method 500 includes accessing a first set of labeled data transactions, the first set of labeled data transactions having been labeled during a review process (510). For example as previously discussed, the training module 270 may access the labeled sets 251 and 252 that were subjected to the further review process by the review module 230.

The method 500 includes training a first risk determination model using at least the set of labeled data transactions (520). For example, as previously described the training module 270 may train the risk determination model 226 using the labeled sets 251 and 252.

The method 500 includes determining by use of the trained first risk determination model a first risk score for each data transaction in a set of unlabeled data transactions (530). For example, the risk score module 220 may determine risk scores 221-224 for each of the data transactions 211-214 in the set of unlabeled data transactions 405.

The method 500 includes, based at least on the determined first risk score, newly labeling one or more of the data transactions in the set of unlabeled data transactions, the newly labeled one or more data transactions being added to a second set of labeled data transactions, the second set of labeled transactions including the first set of labeled transactions and the newly labeled data transactions (540). For example as previously discussed the label module 275 may label some of the unlabeled data transactions. For instance, the data transactions 401 and 402 may be labeled as being approved and the data transactions 403 and 404 may be labeled as being rejected. In some embodiments, this may be based on the low threshold 277 and high threshold 278 in the manner previously described. The newly labeled data transactions 401 and 402 may be added to the labeled set 253 that includes the data transactions of the labeled set 251. The newly labeled data transactions 403 and 404 may be added to the labeled set 254 that includes the data transactions of the labeled set 252.

The method 500 includes training a second risk determination model that is different from the first risk determination model using at least the second set of labeled data transactions (550). For example, as previously described the training module 270 may train the risk determination model 227 using the labeled sets 253 and 254.

In some embodiments, the risk determination model 227 may determine second risk scores 221-224 for the data transactions in the set of unlabeled data transactions 413. The label module 275 may label some of the unlabeled data transactions. For instance, the data transaction 411 may be labeled as being approved and the data transaction 412 may be labeled as being rejected. In some embodiments, this may be based on the low threshold 277 and high threshold 278 in the manner previously described. The newly labeled data transaction 411 may be added to the labeled set 255 that includes the data transactions of the labeled set 253. The newly labeled data transaction 412 may be added to the labeled set 256 that includes the data transactions of the labeled set 254. The labeled sets 255 and 256 may then be used to train the risk determination model 228.

The method 500 includes determining by use of the second trained risk determination model a second risk score for subsequently received data transactions, the subsequently received data transactions being approved or rejected based at least on the second risk scores (560). For example as previously described the risk score module 20 may determine risk scores 221-224 using the trained risk determination model 227 for any subsequently received data transactions 211-214. The determination module 230 may then automatically approve or reject the subsequently received data transactions based on the second risk scores in the manner previously described.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to train one or more risk determination models based on a set of labeled data transactions and one or more sets of unlabeled data transactions, the computing system comprising:
   at least one processor; and
   a non-transitory computer-readable storage medium having stored thereon computer-executable instructions which, when executed by the at least one processor, configure the at least one processor to:
   access a first set of labeled data transactions, the first set of labeled data transactions having been labeled as being approved or rejected during a review process;
   determine, from a first risk determination model trained using machine learning and the first set of labeled data transactions, a first risk score for each data transaction in a first set of unlabeled data transactions, wherein the first risk determination model is an artificial neural network;
   based at least on the determined first risk scores, newly label each data transactions in the first set of unlabeled data transactions as a first set of newly labeled data transactions, wherein:
   when a risk score of a data transaction is lower than a cutoff score, the data transaction is labeled as being approved,
   when a risk score of a data transaction is higher than the cutoff score, the data transaction is labeled as being rejected, and
   when a risk score of a data transaction is within a threshold percentage to the cutoff score, the data transaction is labeled as being reviewed;
   add the first set of newly labeled data transactions that are labeled as approved or rejected to a second set of labeled data transactions, the second set of labeled data transactions including the first set of labeled data transactions and the first set of newly labeled data transactions that are labeled as approved or rejected;
   determine, from a second risk determination model trained using machine learning and the second set of labeled data transactions, a second risk score for each data transaction in a second set of unlabeled data transactions, wherein the second risk determination model is an artificial neural network;
   based at least on the determined second risk scores, newly label each data transaction in the second set of unlabeled data transactions as a second set of newly labeled data transactions, wherein each data transaction in the second set of newly labeled data transactions is labeled as approved, rejected, or reviewed; and
   add the second set of newly labeled data transactions that are labeled as approved or rejected to a third set of labeled data transactions for training a new risk determination model, the third set of labeled data transactions including the second set of labeled data transactions and the second set of newly labeled data transactions that are labeled as approved or rejected.

2. The computing system of claim 1, wherein the set of labeled data transactions includes a subset that is labeled as being approved and a subset that is labeled as being rejected.

3. The computing system of claim 1, wherein the set of labeled data transactions is previously subjected to the review process and accessed from a database.

4. The computing system of claim 1, wherein the set of labeled data transactions is subjected to the review process in real time.

5. The computing system of claim 1, wherein newly labeling one or more of the data transactions in the set of unlabeled data transactions comprises:
   accessing a first threshold that specifies a first risk score that is likely to be approved;
   accessing a second threshold that specifies a first risk score that is likely to be rejected;
   labeling any of the data transactions of the set of unlabeled data transactions that have a risk score below the first threshold as approved; and
   labeling any of the data transactions of the set of unlabeled data transactions that have a risk score above the second threshold as rejected.

6. The computing system of claim 1, wherein at least one of the first risk score and the second risk score are at least partially based on one or more attributes that are associated with the data transactions of the set of unlabeled data transactions.

7. The computing system of claim 1, wherein the computer-executable instructions, when executed by the at least one processor, further configure the at least one processor to:
   determine, by use of a third risk determination model trained using machine learning and the third set of labeled data transactions, a third risk score for each data transaction in a third set of unlabeled data transactions; and
   based at least on the determined third risk scores, newly label each data transaction in the third set of unlabeled data transactions as a third set of newly labeled data transactions, each data transaction in the third set of newly labeled data transactions being labeled as approved, rejected, or reviewed.

8. The computing system of claim 7, wherein the process of training a risk determination model based on the use of a labeled set determined from a previously trained risk determination model is iteratively repeated for one or more additional risk determination models.

9. A computerized method for training one or more risk determination models based on a set of labeled data transactions and one or more sets of unlabeled data transactions, the computerized method comprising:
   accessing a first set of labeled data transactions, the first set of labeled data transactions having been labeled as being approved or rejected during a review process;
   determining, from first risk determination model trained using machine learning and the first set of labeled data transactions, a first risk score for each data transaction in a first set of unlabeled data transactions, wherein the first risk determination model is a neural network;
   based at least on the determined first risk scores, newly labeling each data transaction in the first set of unlabeled data transactions as a first set of newly labeled data transactions, wherein:
   when a risk score of a data transaction is lower than a cutoff score, the data transaction is labeled as being approved, when a risk score of a data transaction is higher than the cutoff score, the data transaction is labeled as being rejected, and when a risk score of a data transaction is within a threshold percentage to the cutoff score, the data transaction is labeled as being reviewed;

add the first set of newly labeled data transactions that are labeled as approved or rejected to a second set of labeled data transactions, the second set of labeled data transactions including the first set of labeled data transactions and the newly labeled data transactions that are labeled as approved or rejected;

determining, from a second risk determination model trained using machine learning and the second set of labeled data transactions, a second risk score for each data transactions in a second set of unlabeled data transaction, wherein the second risk determination model is a neural network;

based at least on the determined second risk scores, newly labeling each data transaction in the second set of unlabeled data transactions as a second set of newly labeled data transactions, wherein each data transaction in the second set of newly labeled data transactions is labeled as approved, rejected, or reviewed;

and adding the second set of new labeled data transactions that are labeled as approved or rejected to a third set of labeled data transactions for training a new risk determination model, the third set of labeled data transactions including the second set of labeled data transactions and the second set of newly labeled data transactions that are labeled as approved or rejected.

10. The method of claim 9, wherein the set of labeled data transactions includes a subset that is labeled as being approved and a subset that is labeled as being rejected.

11. The method of claim 9, wherein the set of labeled data transactions is previously subjected to the review process and accessed from a database.

12. The method of claim 9, wherein the set of labeled data transactions is subjected to the review process in real time.

13. The method of claim 9, wherein newly labeling one or more of the data transactions in the set of unlabeled data transactions comprises:

accessing a first threshold that specifies a first risk score that is likely to be approved;

accessing a second threshold that specifies a first risk score that is likely to be rejected;

labeling any of the data transactions of the set of unlabeled data transactions that have a risk score below the first threshold as approved; and labeling any of the data transactions of the set of unlabeled data transactions that have a risk score above the second threshold as rejected.

14. The method of claim 9, wherein at least one of the first risk score and the second risk score are at least partially based on one or more attributes that are associated with the data transactions of the set of unlabeled data transactions.

15. The method of claim 9, further comprising:

determine, by use of the third risk determination model trained using machine learning and the third set of labeled data transactions, a third risk score for each data transaction in a third set of unlabeled data transactions;

based at least on the determined third risk scores, newly labeling each data transaction in the third set of unlabeled data transactions as a third set of newly labeled data transactions, each data transaction in the third set of newly labeled data transactions being labeled as approved, rejected, or reviewed.

16. A computer program product comprising one or more non-transitory computer-readable storage media having stored thereon computer executable instructions, the computer executable instructions being executable by one or more processors of a computing system to configure the computing system to perform;

access a first set of labeled data transactions and a set of unlabeled data transactions, the set of labeled data transactions having been labeled as being approved or rejected during a review process;

determining, from a first risk determination model trained using machine learning and the first set of labeled data transactions, a first risk score for each of the data transactions in the first set of unlabeled data transactions, wherein the first risk determination model is a neural network;

based at least on the determined first risk score, newly label each data transaction in the set of unlabeled data transactions as a first set of newly labeled data transactions, wherein:

when a risk score of a data transaction is lower than a cutoff score, the data transaction is labeled as being approved, when a risk score of a data transaction is higher than the cutoff score, the data transaction is labeled as being rejected, and when a risk score of a data transaction is within a threshold percentage to the cutoff score, the data transaction is labeled as being reviewed;

add the first set of newly labeled data transactions that are labeled as approved or rejected to a second set of labeled data transactions, the second set of labeled data transactions including the first set of labeled data transactions and the first set of newly labeled data transactions that are labeled as approved or rejected;

determining, from a second trained risk determination model trained using machine learning and the second set of labeled data transactions, a second risk score for each data transaction in a second set of unlabeled data transactions, wherein the second risk determination model is a neural network;

based at least on the determined second risk scores, newly label each data transaction in the second set of unlabeled data transactions as a second set of newly labeled data transactions, wherein each data transaction in the second set of newly labeled data transactions is labeled as approved, rejected or reviewed; and add the second set of newly labeled data transactions that are labeled as approved or rejected to a third set of labeled data transactions for training a new risk determination model, the third set of labeled data transactions including the second set of labeled data transactions and the second set of newly labeled data transactions that are labeled as approved or rejected.

17. The computer program product of claim 16, wherein the set of labeled data transactions includes a subset that is labeled as being approved and a subset that is labeled as being rejected.

18. The computer program product of claim 16, wherein the set of labeled data transactions is previously subjected to the review process and accessed from a database or wherein the set of labeled data transactions is subjected to the review process in real time.

19. The computer program product of claim 16, wherein newly labeling one or more of the data transactions in the set of unlabeled data transactions comprises:

accessing a first threshold that specifies a first risk score that is likely to be approved;

accessing a second threshold that specifies a first risk score that is likely to be rejected;

labeling any of the data transactions of the set of unlabeled data transactions that have a risk score below the first threshold as approved; and labeling any of the data transactions of the set of unlabeled data transactions that have a risk score above the second threshold as rejected.

20. The computer program product of claim 16, wherein the computer-executable instructions, when executed by the at least one processor, further configure the at least one processor to:

determine, by use of a third risk determination model trained using machine learning and the third set of labeled data transactions, a third risk score for each data transaction in a third set of unlabeled data transactions; and based at least on the determined third risk scores, newly label each data transaction in the third set of unlabeled data transactions as a third set of newly labeled data transactions, each data transaction in the third set of newly labeled data transactions being labeled as approved, rejected, or reviewed.

* * * * *

UNITED STATES PATENT AND TRADEMARK OFFICE
CERTIFICATE OF CORRECTION

PATENT NO. : 11,250,433 B2  
APPLICATION NO. : 15/802180  
DATED : February 15, 2022  
INVENTOR(S) : Cezary A. Marcjan et al.

Page 1 of 1

It is certified that error appears in the above-identified patent and that said Letters Patent is hereby corrected as shown below:

On the Title Page

In Item (73), Assignee  
Line 1, change "MICROSOFT TECHNOLOGLY LICENSING, LLC" to --MICROSOFT TECHNOLOGY LICENSING, LLC--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*